United States Patent
Biermann et al.

(10) Patent No.: US 6,769,286 B2
(45) Date of Patent: Aug. 3, 2004

(54) INSTRUMENTED TORSO MODEL

(75) Inventors: Paul J. Biermann, Columbia, MD (US); Jack C. Roberts, Columbia, MD (US); Russell P. Cain, Columbia, MD (US); Bliss G. Carkhuff, Laurel, MD (US); Michael Kleinberger, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 34 days.

(21) Appl. No.: 10/256,517

(22) Filed: Sep. 27, 2002

(65) Prior Publication Data
US 2003/0066365 A1 Apr. 10, 2003

Related U.S. Application Data
(60) Provisional application No. 60/325,317, filed on Sep. 27, 2001.

(51) Int. Cl.[7] ............................ G01M 7/00; G09B 23/28
(52) U.S. Cl. ........................................ 73/12.01; 434/262
(58) Field of Search ........................... 73/12.01; 434/262

(56) References Cited

U.S. PATENT DOCUMENTS

| | | | | | |
|---|---|---|---|---|---|
| 4,409,835 A | * | 10/1983 | Daniel et al. | ............... | 73/866.4 |
| 4,974,833 A | * | 12/1990 | Hartman et al. | ............... | 482/3 |
| 5,628,230 A | * | 5/1997 | Flam | ............... | 73/172 |
| 5,716,302 A | * | 2/1998 | Andersson | ............... | 482/84 |
| 6,110,079 A | * | 8/2000 | Luedke et al. | ............... | 482/83 |
| 6,139,328 A | * | 10/2000 | Picotte | ............... | 434/256 |
| 2003/0031993 A1 | * | 2/2003 | Pugh | ............... | 434/262 |
| 2003/0091967 A1 | * | 5/2003 | Chosack et al. | ............... | 434/262 |
| 2003/0216228 A1 | * | 11/2003 | Rast | ............... | 482/84 |

* cited by examiner

Primary Examiner—Edward Lefkowitz
Assistant Examiner—Takisha S Miller
(74) Attorney, Agent, or Firm—Albert J. Fasulo, II

(57) ABSTRACT

An instrumented torso model that simulates anatomical features and measures the effects on a body caused by various types of impacts. Simulated bone having material properties similar to that of healthy human bone is surrounded by simulated tissue. At least one sensor array is attached to either or both of the simulated bone and the simulated tissue for measuring the effects of the impacts.

10 Claims, 2 Drawing Sheets

INSTRUMENTED TORSO MODEL

CROSS-REFERENCE TO RELATED APPLICATIONS

This application claims the benefit of the co-pending U.S. Provisional Patent Application No. 60/325,317, filed on Sep. 27, 2001, and herein incorporated by reference.

BACKGROUND OF THE INVENTION

1. Field of the Invention

The present invention relates to an instrumented torso model that simulates anatomical features and measures the effects on a body caused by various types of impacts.

2. Background

People have used body armor such as wooden and metal shields, vest plates, chain mail and other types of armor throughout history. The technology of soft body armor to protect against bullets matured in the 1970's with the development of an aramid fiber (Kevlar®) by the DuPont Corporation. Bulletproof vests incorporating soft body armor are generally preferred over vests that use rigid plates because of weight and comfort concerns.

Soft body armor is designed to prevent projectiles from penetrating the body. When effective, soft body armor spreads the impact of a bullet over a wide area of the body and prevents a puncture wound. However, experiments in the 1970's using laboratory animals demonstrated that even when soft body armor prevents a puncture wound the liver, heart, spleen and spinal cord are still vulnerable to severe injuries known as Behind Armor Blunt Trauma (BABT). See Carroll, A. W. and Soderstrom, C.A., "A New Nonpenetrating Ballistic Injury", *Ann. Surg.*, 188, 6,pp753–757 (1978). Other studies have used high-speed photography to show that when impacted by a bullet the body acts as a highly damped or "viscous" system. When a bulletproof vest successfully stops a bullet, the human torso behind the vest exhibits viscoelastic behavior that includes the propagation of several types of BABT inducing waves, including: 1) stress waves—longitudinal pressure waves that travel at or slightly faster than the velocity of sound in tissue; 2) shock waves—waves of high pressure characterized by an effectively instantaneous wavefront propagated through underlying tissue at a velocity faster than the velocity of sound in tissue; and 3) shear waves—transverse waves of long duration and relatively low velocities that produce gross distortions of tissue and organs. Finally, the wearer of a bulletproof vest may also be subject to crush injury. Crush injury results from the intense static impulse load that is applied to underlying tissue when a bullet is stopped by body armor.

The modes by which the above bullet-induced waves and forces damage bones, organs and tissue are very complex. For example, stress and shear waves account for many injuries distant from the blunt impact. Stress waves in tissue may result in very high local forces producing small but very rapid distortions. Such rapid distortions usually do not result in gross lacerations to tissue; rather their effects are largely concentrated at the microvascular level to produce extravasations of blood. Shear waves may produce marked distortion of internal organs adjacent to the body wall that results in contusions or lacerations. Crush injury from a bullet impacting body armor may include bowel laceration from the gross compression of the anterior abdominal wall resulting in contact with the retroperitoneal surface. Finally, sternal fracture and gross myocardial injuries show a significant correlation to the degree of chest displacement when pigs are subjected to non-penetrating midsternal impact.

The nature of the above injuries in a specific case of a bullet impacting a human torso that is protected by body armor is based on complex relationships between numerous variables. The anatomical location and direction of impact are also significant factors that determine the extent of injury. However standard tests for body armor do not measure these anatomical factors. Current methods of testing body armor include use of clay physical models. According to the National Institute of Justice (NIJ) ballistic standard 0101.04 for the testing of body armor, a flat 10.2 cm (4.0 inch) deep layer of clay is placed behind soft personnel protective armor and shot with different munitions. The depth of deformation of the clay is then measured and, for the armor to pass the test, must be less than 4.4 cm. Other tests include wrapping soft armor around blocks of "ballistic gelatin", a low water content mixture of Knox Gelatin, to simulate a torso. The gelatin acts as an analog for soft human tissue to show the damage path and wound area during penetration tests of body armor. For non-penetrating tests the deformation in the gelatin can be captured with high-speed photography or x-rays. Unfortunately testing techniques involving only clay or ballistic gelatin are not capable of accurately estimating internal injury to a person when a bullet strikes a particular point on their bulletproof vest.

Effective body armor minimizes injury by transferring the kinetic energy of a projectile over an extended time-scale or surface area. Body armor that accomplishes such energy transfer using lightweight materials that are comfortable to wear involves sophisticated technology and engineering. Effective testing methods for such body armor also require the use of sophisticated technology. Existing testing methods do not include sensors and instrumentation for recording the deformation of ribs and the effect of the shock, shear and stress waves that pass through the human torso. To better assess the quality of new body armor designs, new injury criteria are needed to quantify the damage of different non-penetrating munitions to the internal organs. Therefore there is a need for a human surrogate torso for the purposes of measuring deformation of ribs and the sternum and kinetic energy imparted to organs from different types of non-penetrating munitions.

An anatomically correct instrumented model of the human torso capable of measuring how the above bullet-induced waves and forces damage particular organs, bones and tissue could significantly improve the design and testing of body armor. Such a model could yield measurements that show, for example, that a new prototype design of body armor would be very effective at preventing injury when a bullet strikes one area of the torso but leaves the wearer vulnerable to significant injury if a bullet strikes another area of the torso.

Prior art devices related to an instrumented torso for testing body armor include the anthropometric test devices (ATDs) or crash dummies used primarily in vehicle crash analyses. Such ATDs are designed to simulate the general overall dynamics of humans during vehicle crashes, but are generally not anatomically accurate on more local anatomical scales. For example, most ATDs are expensive and are therefore designed to withstand numerous vehicle crashes before they need replacement. Therefore the ribs of ATDs are generally made of steel, rather than of a more anatomically accurate bone simulant. ATDs have been designed to measure more local anatomical effects of vehicle crashes such as chest deflection. But the torso instrumentation used in these designs is very simple such as a single linear variable differential transducer (LVDT) mounted on a steel sternum. Such an ATD would be of limited use in estimating damage to internal organs caused by a bullet impacting body armor.

An anatomically accurate instrumented torso model would also be useful in designing and testing other types of law enforcement devices such as "bean bags" and other weapons that are used to temporarily disable individuals without inflicting lethal harm. For example instrumented torso models would be helpful in determining how such devices should be sized and aimed for maximum effectiveness. Such torso models would also be useful in training law enforcement personnel in the effective use of various weapons. Other uses for an anatomically correct instrumented torso include automotive crash testing and martial arts, boxing and other types of sports training.

SUMMARY OF THE INVENTION

The present invention is therefore an instrumented model of the human torso with simulated anatomic features for measuring the effects of high or low velocity impacts. It includes simulated bone having material properties similar to that of healthy human bone and simulated tissue surrounding the simulated bone. Finally, at least one sensor array is attached to either or both of the simulated bone and the simulated tissue for measuring the effects on the torso of the impacts.

BRIEF DESCRIPTION OF THE DRAWINGS

For a more complete understanding of the present invention and the advantages thereof, reference is now made to the following detailed description taken in conjunction with the accompanying drawings in which.

DETAILED DESCRIPTION OF THE PREFERRED EMBODIMENTS

Figure 1:
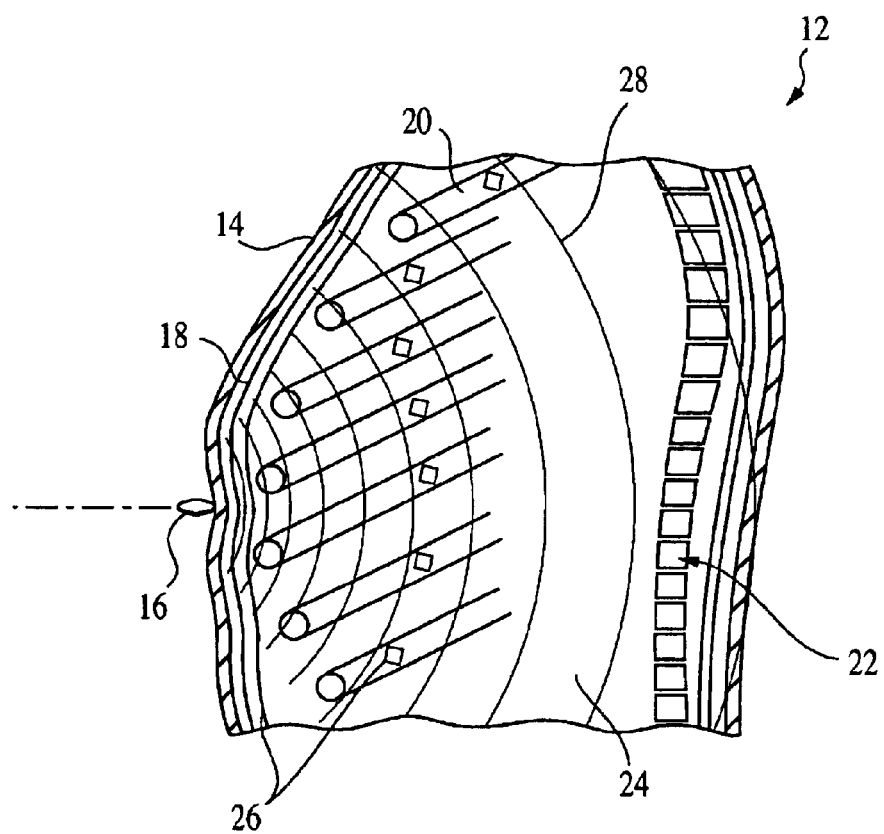
FIG. 1 is schematic drawing of one embodiment of the present invention that is designed for ballistics testing.

FIG. 1 is schematic drawing of one embodiment of the present invention that is designed for ballistics testing. The embodiment is an instrumented torso 12 designed to "wear" body armor 14 and record various forces, accelerations, translations and damage affecting the torso 12 when the armor 14 is impacted with a bullet 16 fired at a testing facility. The simulated shock waves 28 shown in the drawing illustrate how the stress, shock and shear waves related to Behind Armor Blunt Trauma radiate outward from a bullet's point of impact. The embodiment of the present invention shown in FIG. 1 includes a skin 18 and internal soft tissue 24 made of a flexible polymer such as polyurethane or silicone, and ribs 20, sternum and vertebrae 22 made of a bone substitute that exhibits bone-like properties such as stiffness, brittleness and fracture toughness. Useful materials for fabricating such bone substitutes include polymeric resins such as epoxy or urethanes containing inorganic fillers such as glass or ceramic in various form factors. Examples of such materials are described in U.S. Pat. No. 6,116,911 by Biermann et al., herein incorporated by reference. For use in the present invention, such materials may be modified to increase their tensile and bending strength to match that of bone by adding additional glass fiber or other fiber reinforcements.

Because the bone substitutes behave like bone on a local scale (e.g., sub-millimeter scale), the substitutes are able to actually fracture and splinter under conditions that would also break real human bones inside a living person. This feature is different from other bone substitutes, such as the steel ribs used in vehicle crash test dummies, that are designed to simulate real bones only on a macro scale. For example steel ribs on a crash test dummy may be used to effectively simulate the gross deflection of the human sternum during a vehicle crash, but could not be used effectively to simulate local bone damage caused by a bullet.

The skin 18 and soft tissue 24 substitutes may be formed from polymers exhibiting the mechanical properties that approximate those found in the body. Elastomeric polymers such as polyurethane and silicone are well suited to this, in particular those materials with a Shore A hardness <60, a Young's modulus (E)<900.0 psi or 6.20E–3 Mpa, and a density between 1.00 E–6 and 1.30 E–6 g/mm$^3$. Polyurethanes offer lower material costs and simple processing. Silicones offer better mechanical durability, ultraviolet resistance and better overall material stability. A large number of resin systems in both families have been tailored for use in the make-up and special effects fields to simulate biological materials, and in the medical prosthetics field for devices that allow people to cover missing or deformed portions of their body. These include nose, ear, jaw, eye-socket, fingers, hand, feet, toes, upper and lower limbs. The prosthetic applications typically need to mimic only the visual aspects of the item being replaced, but some mechanical behavior similarity is useful. For movie or theatrical make-up and special effects, the materials frequently must behave in a believable manner when mechanically loaded, and these materials are designed with that in mind. Additional materials can be used, but their processing may be more complex and the material properties more difficult to tune for the required mechanical response. These include, but are not limited to, rubber made from latex, butyl, neoprene, nitrile and gum base resins. Also, thermoplastic resins such as vinyl, nylon, polyethylene, and the whole range of thermoplastic elastomers could be used, but require a large investment in tooling for injection molding or transfer molding.

The simulated human tissue 24 is placed inside the thoracic cavity of the torso 12 and around the ribs 20 and vertebrae 22. The simulated tissue 24 may also include materials of various densities to simulate specific organs. For example, the liver is particularly vulnerable to Behind Armor Blunt Trauma and is subject to tearing under the extreme stress of the shear waves that can bounce back and forth inside the thoracic cavity. Therefore the designers of body armor should pay special attention to the protection of the liver. Clearly other organs such as the heart (specifically the aorta and aortic arch) and lungs may also require special instrumented modeling in some embodiments of the present invention.

Finally, several sensor arrays 26 are positioned on and inside of the torso 12. The sensor arrays 26 may include many different types of sensors to help develop a clear understanding of how a physical impact against the torso 12 creates forces, accelerations, translations, and damage concerning the different parts of the torso 12. Any type of sensor may be used, provided of course that it is capable of operating at the frequencies induced by the test incident. A bullet impacting a bulletproof vest can create standing waves inside the body near 1 to 2 KHz. As an example, piezoelectric accelerometers and resistive strain gages may be bonded to the simulated bone elements such as the ribs 20 and vertebrae 22. Accelerations of the bones may then be directly correlated to surrounding tissue damage.

Strain gages attached to the simulated bone could provide useful information concerning whether the bone fractures due to impact. Damage to organs and tissue may also be estimated based on data from accelerometers or resistive grids encapsulated in low durometer polymers that are then mechanically coupled to the simulated organs and tissue. Piezoelectric and resistive flexure sensor grids placed in various planes of the torso 12 may also be useful, such as in a plane perpendicular to the direction of the bullet inside the simulated tissue 24 for measuring the wave forces that pass through the tissue 24.

Figure 2:
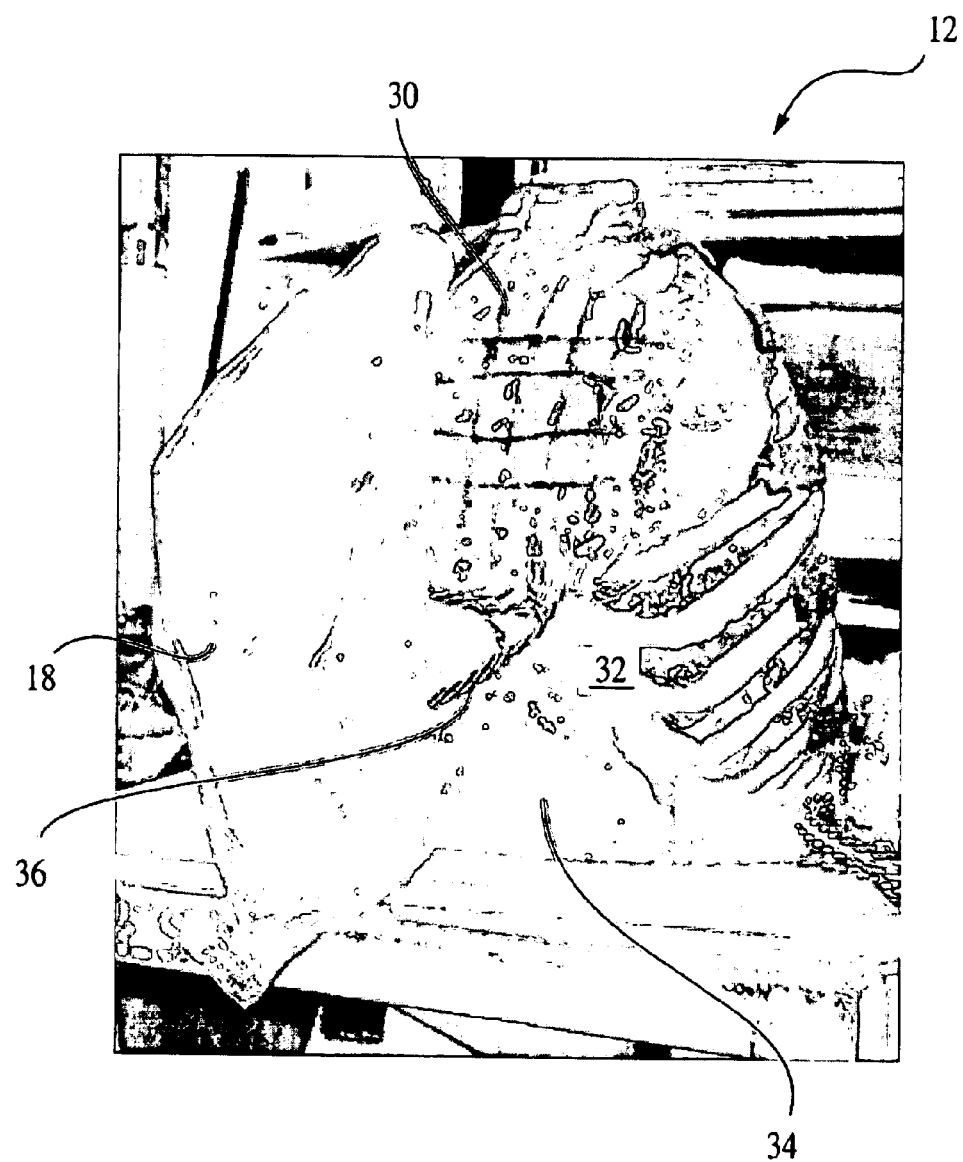
FIG. 2 is a drawing of a prototype of one embodiment the present invention that was used in ballistics testing.

FIG. 2 is a drawing of a prototype of one embodiment the present invention that was used in ballistics testing. The skin 18 is shown peeled back to reveal a 4"×4" piezoelectric sensor grid 30 that is cast into ballistic gelatin and positioned under the fat and skin layers, above the stomach muscles, outside of the rib cage 32, and over the heart region. A second 4"×4" sensor grid (not shown in FIG. 2) comprising flexure strip sensors was positioned directly behind the piezoelectric sensor grid 30. Flexure strip sensors, which are used in computer gaming gloves, are based on a silver-carbon layered film that changes its resistance when bent. Although flexure strip sensors exhibit a non-linear response to bending, they are very robust and therefore suitable to some embodiments of the present invention. To simplify the embodiment shown in FIG. 2 and to save costs, a single gel-filled sack 34 was created to simulate the homogenous bulk behavior of the lungs, heart, and other internal organs. Finally, in FIG. 2, lead wires 36 extend from the sensor grid 30 and are routed to instrumentation (not shown).

The number and type of sensors attached to a model torso 12 according to the present invention will vary depending on the intended use of the torso 12. Ballistics testing likely requires more sophisticated sensors whereas a torso 12 used in martial arts training could include only a few sensors to provide feedback for example on the strength and technique of a punch or kick. Embodiments for training in other sports involving physical impacts against the body such as boxing and football would also use different numbers and types of sensors.

During a test operation on a torso 12 designed according to the present invention, the signals from the various sensors are wired or otherwise connected to signal conditioning devices such as charge amplifiers and Wheatstone bridges and then recorded using a high-speed data acquisition system.

Because the model torso 12 is designed to accurately simulate a real human body experiencing exceptionally powerful forces, portions of the model torso 12 may fracture, tear, or otherwise be damaged during use. Some embodiments of the invention may include component parts intentionally designed to receive irreparable damage during use. Post-test event visual inspections of the damaged components could then provide additional useful data for analyzing and understanding the test event. For example, simulated ribs 20 may be designed to fracture or splinter in modes similar to those of healthy real human bone. A material's ability to resist the propagation of a brittle fracture near a flaw is generally associated with the property named "fracture toughness" expressed in $kJ/m^2$. Healthy human bone has a fracture toughness of around 1.2 $kJ/m^2$. Whereas high-strength steels such as those used in the ribs of vehicle crash dummies have a fracture toughness of greater than 140 $kJ/m^2$. Many embodiments of the present invention would therefore include simulated bones having a fracture toughness that is of the same order of magnitude as real bone.

To enable model torsos 12 according to the present invention to be reused, some embodiments of the present invention therefore require that some components of the torso 12 be disposable and easily replaceable. Simple bolts, screws or snap-locks for bones, and zippers or Velcro® fasteners for skin and tissue, are examples of the many types of fasteners for attaching and quickly replacing disposable components that would be obvious to those skilled in the art.

An extended version of a torso 12 according to the present invention could be used in automotive crash testing to reproduce the correct mass of the human as well as the correct mechanical properties of the skeleton and internal organs. Data from the tests could then be used to assess injury to the skeletal structure as well as the internal organs during a crash, in real-time or post-crash analysis. An upgraded and ruggedized version of the torso 12 could be used in crash tests and the damaged structural pieces or internal organs could be easily and economically replaced.

Still other uses of the present invention include testing and training with "less-than-lethal" law enforcement weapons such as "bean-bags" and other devices that are used to disarm or disable individuals without killing them. Law enforcement personnel could use a torso 12 according to the present invention to perfect their skills in using less-than-lethal weapons. Resulting data from such training could indicate whether the weapons were used safely and effectively.

The above therefore discloses an instrumented torso model that simulates anatomical features and measures the effects on a body caused by various types of impacts. Alterations, modifications, and improvements will readily occur to those skilled in the art. Such alterations, modifications, and improvements as are made obvious by this disclosure are intended to be included in this disclosure though not expressly stated herein, and are intended to be within the spirit and scope of the invention. Accordingly, the foregoing description is by way of example only, and not limiting. The invention is limited only as defined in the following claims and equivalents thereto.

I claim:

1. An instrumented torso model for measuring the effects of high or low velocity impacts, comprising:

simulated bone, including anatomically correct simulated ribs and sternum shaped and configured like those of a real human, having a fracture toughness of less than 10 $KJ/m^2$;

simulated tissue surrounding said simulated bone; including simulated layers of fat and skin outside said simulated ribs and sternum, and a gelatin layer between said simulated ribs and sternum and said simulated layers of fat and skin; and a sensor array, including a sensor grid, cast into said gelatin layer for measuring the effects of the impacts on either said simulated ribs and sternum or said simulated tissue.

2. The instrumented torso model as recited in claim 1, wherein said sensor array comprises sensors selected from the following group: accelerometers, force transducers, and displacement transducers.

3. The instrumented torso model as recited in claim 2, wherein said sensors comprise piezoelectric sensors.

4. The instrumented torso model as recited in claim 1, further comprising a plurality of sensor arrays attached to both said simulated bone and to said simulated tissue.

5. The instrumented torso model as recited in claim 1, wherein said simulated tissue comprises polyurethane.

6. The instrumented torso model as recited in claim 1, further comprising simulated organs embedded in said simulated tissue.

7. The instrumented torso model as recited in claim 1, further comprising a covering on said simulated tissue that is marked with appropriate contact points designed to be impacted during athletic training.

8. The instrumented torso model as recited in claim 7, wherein said contact points marked on said covering identify locations on the torso that should be struck during martial arts training.

9. The torso model of claim 1, further comprising a second grid between the sensor array, including said sensor grid, and said simulated ribs and sternum.

10. The torso model of claim 1, wherein said fracture toughness of said simulated bone, including said simulated ribs and sternum, is of the same order of magnitude as that of real bone, 1.2 $KJ/m^2$.

* * * * *